United States Patent
Hashiba et al.

(10) Patent No.: US 8,951,436 B2
(45) Date of Patent: Feb. 10, 2015

(54) POSITIVE ELECTRODE ACTIVE MATERIAL

(75) Inventors: Yuji Hashiba, Narita (JP); Kei Yoshimura, Inzai (JP); Shinichi Tachizono, Narita (JP); Takashi Naito, Funabashi (JP); Takuya Aoyagi, Hitachi (JP); Tadashi Fujieda, Mito (JP)

(73) Assignee: Hitachi, Ltd., Tokyo (JP)

( * ) Notice: Subject to any disclaimer, the term of this patent is extended or adjusted under 35 U.S.C. 154(b) by 126 days.

(21) Appl. No.: 13/637,986

(22) PCT Filed: Mar. 31, 2011

(86) PCT No.: PCT/JP2011/058205
§ 371 (c)(1),
(2), (4) Date: Sep. 28, 2012

(87) PCT Pub. No.: WO2011/125834
PCT Pub. Date: Oct. 13, 2011

(65) Prior Publication Data
US 2013/0015410 A1   Jan. 17, 2013

(30) Foreign Application Priority Data
Mar. 31, 2010   (JP) .................. 2010-079938

(51) Int. Cl.
*H01M 4/88*      (2006.01)
*H01B 1/08*      (2006.01)
(Continued)

(52) U.S. Cl.
CPC .............. *H01M 4/364* (2013.01); *B82Y 30/00* (2013.01); *C01G 45/1228* (2013.01); *C01G 51/00* (2013.01); *C01G 53/00* (2013.01); *H01M 4/485* (2013.01); *H01M 4/505* (2013.01); *H01M 4/525* (2013.01); *H01M 4/5825* (2013.01); *C01G 31/02* (2013.01); *C01G 49/009* (2013.01);
(Continued)

(58) Field of Classification Search
USPC ............................................ 252/520.4, 182.1
See application file for complete search history.

(56) References Cited

U.S. PATENT DOCUMENTS

| | | | |
|---|---|---|---|
| 6,517,974 B1 * | 2/2003 | Kobayashi et al. ...... | 429/231.95 |
| 2002/0055041 A1 | 5/2002 | Kobayashi et al. | |
| 2003/0211396 A1 | 11/2003 | Kobayashi et al. | |

FOREIGN PATENT DOCUMENTS

| | | |
|---|---|---|
| CN | 1225518 | 8/1999 |
| CN | 1397496 | 2/2003 |

(Continued)

OTHER PUBLICATIONS

Communication mailed May 19, 2014, in connection with Chinese Patent Application No. 201180017174.3, 8 pages; Chinese Patent Office, Republic of China.

*Primary Examiner* — Mark Kopec
*Assistant Examiner* — William Young
(74) *Attorney, Agent, or Firm* — Antonelli, Terry, Stout & Kraus, LLP (57) ABSTRACT

A lithium ion secondary battery has a high cycle retention rate, and has its battery capacity increased. A positive electrode active material is used which includes a crystal phase having a structure formed by collecting a plurality of crystallites, and powder particles containing amorphous phases and formed between the crystallites. The amorphous phases and contain one or more kinds of metal oxides selected from the group consisting of vanadium oxide, iron oxide, manganese oxide, nickel oxide and cobalt oxide. The crystal phase and the amorphous phase and are capable of intercalation and deintercalation of lithium ions.

14 Claims, 5 Drawing Sheets

(51) Int. Cl.
    *H01M 4/36*        (2006.01)
    *B82Y 30/00*       (2011.01)
    *C01G 45/12*       (2006.01)
    *C01G 51/00*       (2006.01)
    *C01G 53/00*       (2006.01)
    *H01M 4/485*       (2010.01)
    *H01M 4/505*       (2010.01)
    *H01M 4/525*       (2010.01)
    *H01M 4/58*        (2010.01)
    *C01G 31/02*       (2006.01)
    *C01G 49/00*       (2006.01)
    *H01M 4/62*        (2006.01)
    *C01G 31/00*       (2006.01)
    *H01M 10/052*      (2010.01)
    *H01M 4/02*        (2006.01)
    *H01M 4/587*       (2010.01)

(52) U.S. Cl.
    CPC .............. *H01M 4/625* (2013.01); *C01G 31/00* (2013.01); *C01P 2004/03* (2013.01); *C01P 2004/45* (2013.01); *C01P 2004/64* (2013.01); *C01P 2006/40* (2013.01); *C01P 2006/80* (2013.01); *H01M 10/052* (2013.01); *H01M 2004/021* (2013.01); *Y02E 60/122* (2013.01); *Y02T 10/7011* (2013.01); *H01M 4/587* (2013.01); *C01P 2002/02* (2013.01); *C01P 2002/60* (2013.01); *C01P 2002/77* (2013.01); *C01P 2002/85* (2013.01); *C01P 2004/80* (2013.01)
    USPC .................................. 252/182.1; 252/520.4

(56) References Cited

FOREIGN PATENT DOCUMENTS

| | | | |
|---|---|---|---|
| JP | 5-47386 | | 2/1993 |
| JP | 8-83606 | | 3/1996 |
| JP | 2973830 | * | 3/1996 |
| JP | 9-35712 | | 2/1997 |
| JP | 11-283627 | | 10/1999 |
| JP | 2001-76724 | | 3/2001 |
| JP | 4058680 | | 12/2007 |
| JP | 2009-16277 | | 1/2009 |

* cited by examiner

POSITIVE ELECTRODE ACTIVE MATERIAL

TECHNICAL FIELD

The present invention relates to positive electrode active materials.

BACKGROUND ART

Power supplies for electric vehicles are required to have the following characteristics: large battery capacity, less degradation through cycles, available high-speed charging and discharging, etc. Especially, a lithium ion secondary battery (hereinafter referred to as a Li ion secondary battery) has attracted attention.

As a positive electrode active material for the Li ion secondary battery, lithium cobaltate produces a relatively large battery capacity of about 150 mAh/g. The lithium cobaltate, however, still has the problems associated with safety at high temperature or in overcharge due to its high activity. For this reason, the lithium cobaltate is not used for applications of the electric vehicles.

Thus, an olivine-structured lithium iron phosphate and lithium manganese phosphate, a substitutional spinel-structured lithium manganese oxide, lithium vanadium oxide, and lithium vanadate and the like have been proposed as safer material, and the improvement of the properties of such materials has been studied.

Patent Document 1 discloses a technique that uses an amorphous $V_2O_5$—$P_2O_5$ for a positive electrode active material so as to provide an entire solid lithium secondary battery with a large capacity and excellent charging and discharging cycle characteristics.

Patent Document 2 discloses a technique that sets an average crystallite size of crystals of a lithium iron phosphate or lithium manganese phosphate having an olivine crystal structure to 140 nm or less so as to obtain good charging and discharging capacities and good load characteristics.

Patent Document 3 discloses a technique that uses an electrode active material mainly containing at least one of glass and glass ceramic composed of lithium-contained iron vanadium phosphate which contains at least one element selected from the group consisting of Co, Mn and Ni so as to obtain the high discharging rate, discharging current, and battery output.

Patent Document 4 discloses a technique that uses a spinel lithium manganese oxide in which Mn is partly replaced by at least one kind of transition metal elements selected from the group consisting of Co, Ni, Fe, V, Cr and Ti so as to provide a positive electrode active material keeping good performance of a positive electrode after the continuous use thereof under a high-temperature circumstance at a charging voltage of 4 V or more.

Patent Document 5 discloses a technique that contains a combination of a crystalline phase and an amorphous phase of a composite oxide of vanadium, and lithium or a first transition metal in a positive electrode active material so as to provide a lithium secondary battery with a large charging and discharging capacity, a high energy density, and a long cycle life.

PRIOR ART DOCUMENTS

Patent Documents

[Patent Document 1]
 Japanese Unexamined Patent Publication No. 1993-47386

[Patent Document 2]
 Japanese Patent Publication No. 4058680
[Patent Document 3]
 Japanese Unexamined Patent Publication No. 2009-16277
[Patent Document 4]
 Japanese Unexamined Patent Publication No. 1997-35712
[Patent Document 5]
 Japanese Patent Publication No. 2973830

SUMMARY OF THE INVENTION

Technical Problem

Accordingly, it is an object of the present invention to provide a positive electrode active material with more safety, a high charging and discharging cycle retention rate, and a large capacity in application to a lithium ion secondary battery.

Solution to Problem

A positive electrode active material of the present invention includes a crystal phase formed of a plurality of crystallite, and an amorphous phase formed in contact with the crystallites. The above amorphous phase contains one or more kinds of metal oxides selected from the group consisting of vanadium oxide, iron oxide, manganese oxide, nickel oxide, and cobalt oxide. The crystal phase and the amorphous phase are capable of intercalation and deintercalation of a lithium ion.

Effect of Invention

Accordingly, the present invention can provide a positive electrode active material that exhibits the high cycle retention rate, and which increases the battery capacity of the lithium ion secondary battery.

MODE FOR CARRYING OUT THE INVENTION

Now, a positive electrode active material according to one embodiment of the present invention will be described below. The positive electrode active material contains a crystal phase having a structure including a collection of a plurality of crystallites, and an amorphous phase formed in contact with the crystallite. The amorphous phase contains one or more kinds of metal oxides selected from the group consisting of vanadium oxide, iron oxide, manganese oxide, nickel oxide and cobalt oxide. The crystal phase and the amorphous phase are capable of intercalation and deintercalation of lithium ions.

The amorphous phase is formed in contact with the crystallite. More specifically, the amorphous phase is formed in a surface region of each powder particle of the positive electrode active material, that is, in a region where the powder particles are in contact with the external environment (gas-phase or liquid-phase), or in a grain boundary region of the crystallite to be described in the following examples.

The term "grain boundary region" as used therein means a region interposed between the crystallites. It can be understood that the amorphous phase is formed in the grain boundary region. In this case, the term "grain boundary" as used herein means an interface of crystallites.

Note that the embodiment of the present invention can also include a positive electrode active material not containing the amorphous phase between the crystallites, and having the amorphous phase only in the surface regions of the above powder particles.

In the positive electrode active material, the grain boundary region of the crystal phase is preferably filled with the amorphous phase formed between the crystallites. That is, the crystal phase is preferably covered with the amorphous phase. It is noted that in the present invention, some crystallites may be in direct contact with each other to form the grain boundary.

Further, it can be understood that the amorphous phase is formed in the grain boundary region interposed between the crystallites. The amorphous phase may be formed over the surface of each powder particle of the positive electrode active material containing the crystal phase and the amorphous phase, that is, the interface between the powder particle and the gas phase.

Not only the crystal phase, but also the amorphous phase is capable of the intercalation and the deintercalation of lithium ions, and the crystal phase is covered with the amorphous phase. Thus, the intercalation and deintercalation of lithium ions into and from the crystal phase is carried out via the amorphous phase by charging and discharging. The crystal phase contributes to the battery capacity, and the amorphous phase also contributes to the battery capacity. This arrangement can suppress the degradation of the crystal phase due to the intercalation and deintercalation of the lithium ions to thereby improve the charging and discharging cycle retention rate.

In the following, various preferred embodiments of the positive electrode active material in the present invention will be described by way of example.

In the positive electrode active material, the crystal phase and the amorphous phase form the powder particles.

In the positive electrode active material, the amorphous phase contains phosphorus oxide.

In the positive electrode active material, the amorphous phase contains vanadium oxide.

In the positive electrode active material, the amorphous phase contains at least one kind of metal oxide selected from the group consisting of iron oxide and manganese oxide.

In the positive electrode active material, a content of the amorphous phase in the powder particles is 6% by volume or more.

In the positive electrode active material, an atomic ratio of the content of vanadium, iron, manganese, nickel and cobalt in the amorphous phase to that of phosphorus in the amorphous phase is in a range of 0.5 to 9.0.

In the positive electrode active material, the crystallite contains oxides of one or more kinds of metals selected from the group consisting of iron, manganese and vanadium.

In the positive electrode active material, the crystallite is represented by $X_yV_2O_5$ (where X is one kind of metal selected from the group consisting of Li, Na, K, Cu, Ag and Fe, and Y is in a range of 0.26 to 0.41).

In the positive electrode active material, an average crystallite size of the crystallite is 300 nm or less.

In the positive electrode active material, the powder particle is obtained in a crystallization step which involves heat treatment of an oxide glass containing phosphorus and one kind of metal selected from the group consisting of vanadium, iron, manganese, nickel and cobalt.

In the positive electrode active material, the oxide glass contains a monovalent cation.

The positive electrode active material is formed by introducing lithium ions into the powder particles after the crystallization step.

The positive electrode active material further contains carbon.

Hereinafter, the present invention will be described below with reference to the accompanying drawings.

(Positive Electrode Active Material)

Figure 1A:
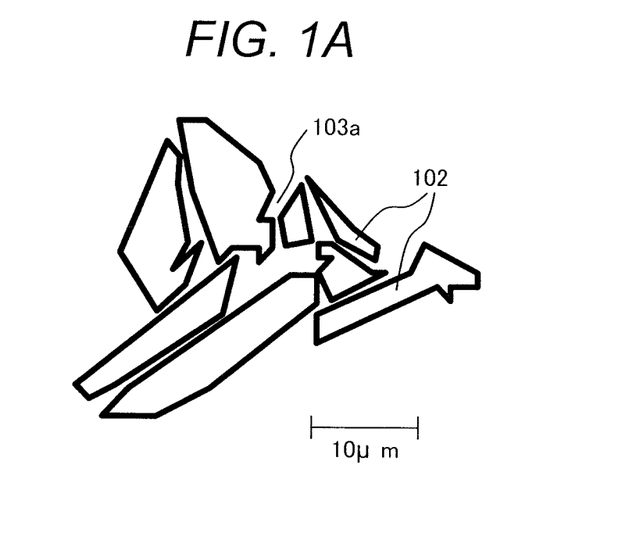
FIG. 1A is an exemplary diagram showing a microstructure of a positive electrode active material in an example.
Figure 1B:
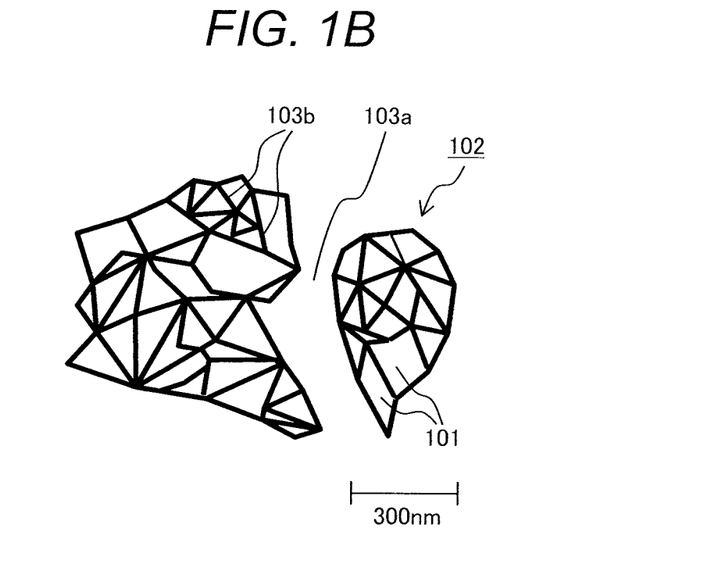
FIG. 1B is an enlarged exemplary diagram showing the microstructure of the positive electrode active material shown in FIG. 1A.

FIG. 1A shows an exemplary diagram of a microstructure of a positive electrode active material (conductive material) in an example. FIG. 1B further shows an enlarged exemplary diagram of the microstructure of the positive electrode active material shown in FIG. 1A.

As shown in FIG. 1A, a crystal of the positive electrode active material includes a secondary particle 102 and an amorphous phase 103a (hereinafter referred to as an amorphous oxide phase). The amorphous phase 103a is formed in a gap between the adjacent secondary particles 102. The term "adjacent" means the state of "adjacent to each other".

Referring to FIG. 1B, primary particles 101 of the crystals are agglutinated to form the secondary particle 102 having a shape like a bunch of grapes. The amorphous phase 103a is formed around the secondary particle 102. As shown in FIG. 1B, the fine amorphous phase 103b is formed in a gap between the adjacent primary particles 101 (which is a very small region, and thus represented by a solid line).

In the amorphous phases 103a and 103b, a distance between atoms forming the phase is large, which easily achieves intercalation and deintercalation of Li ions in charging and discharging as compared to the inside of the crystallite (primary particle 101 of the crystal), resulting in a high charging and discharging cycle retention rate (hereinafter referred simply to as "cycle retention rate").

Thus, the grain boundary region of the crystalline filled with the amorphous phase 103 having the large atomic distance serves to increase a diffusion rate of Li ions between the grain boundary region and the crystalline in charging and discharging, and thus can improve the cycle retention rate of the positive electrode active material for the Li ion secondary battery.

Generally, the amorphous phase 103 is known to have a low battery capacity.

In contrast, in the positive electrode active material of the example, the amorphous phase 103 serves not only to increase the diffusion rate of Li ions between the grain boundary region and the crystalline in charging and discharging, but also to increase the number of Li ions that can be intercalated into the structure of the amorphous phase 103. Thus, this embodiment can improve the cycle retention rate of the positive electrode active material, as well as the battery capacity.

The content of the amorphous phase in the positive electrode active material for the Li ion secondary battery is preferably 6% by volume or more.

In order to improve the cycle retention rate, the content of the amorphous phase 103 is desired to be larger. For the content of the amorphous phase 103 of less than 6% by volume, the cycle retention rate of the positive electrode active material would be reduced.

The positive electrode active material can contain carbon. The carbon can be added in the form of powder, and alternatively, can be applied to the surface of powder of the positive electrode active material by coating. In each case, the carbon can be added so as to adjust the electric resistance of the positive electrode active material.

(Amorphous Phase)

The amorphous phase of the positive electrode active material contains at least one kind of metal oxide selected from the group consisting of a vanadium oxide, an iron oxide, a manganese oxide, a nickel oxide and a cobalt oxide.

At least one kind of metal oxide selected from the group consisting of the vanadium oxide, the iron oxide, the manganese oxide, the nickel oxide and the cobalt oxide forms the amorphous phase. The metal oxide is studied as a component of a composite oxide crystal with lithium to be applied to the positive electrode active material.

The amorphous phase can further contain a phosphorus oxide, or a silicon oxide as a component.

Vanadium, iron, manganese, nickel and cobalt are studied as a component of the composite oxide crystal with phosphorus and lithium to be applied to the positive electrode active material. Even when the composite oxide crystal is in the amorphous state, the positive electrode active material exhibits the high charging and discharging characteristics.

Iron, manganese, nickel and cobalt are studied as a component of the composite oxide crystal with silicon and lithium to be applied to the positive electrode active material. Even when the composite oxide crystal is in the amorphous state, the positive electrode active material exhibits the high charging and discharging characteristics.

Vanadium, iron, manganese, nickel, and cobalt are contained in the amorphous phase together with phosphorus, which can provide the battery with the large battery capacity and the improved cycle characteristics. That is, the improved battery characteristics can be obtained.

Iron, manganese, nickel and cobalt are contained in the amorphous phase together with silicon, which can provide the battery with the large battery capacity and the improved cycle characteristics. That is, the improved battery characteristics can be obtained.

In the amorphous phase containing phosphorus, an atomic ratio (ratio of the number of atoms) of vanadium, iron, manganese, nickel and cobalt contained in the amorphous phase with respect to phosphorus contained in the amorphous phase is preferably in a range of 0.5 to 9.0. For an atomic ratio of 0.5 to 9.0, the effect of improving the battery capacity and cycle retention rate is emphasized. For an atomic ratio below 0.5, or above 9.0, the amorphous phase becomes unstable in charging and discharging, which reduces the effect of improving the battery capacity and the cycle retention rate.

(Crystallite)

The crystallite of the positive electrode active material is an oxide phase containing a transition metal.

In order to improve the battery capacity, it is necessary to easily achieve intercalation and deintercalation of lithium ions into and from the positive electrode active material. The crystalline is required to have a large capacity in addition to the above characteristics.

Thus, the transition metal desirably contains vanadium, iron, manganese, cobalt and nickel.

The crystalline containing vanadium preferably contains a monoclinic $X_y V_2 O_5$ crystal.

The monoclinic $X_y V_2 O_5$ crystal has a cylindrical structure including cations (X) which regularly couple layered structures of vanadium oxide together. From the viewpoint of safety and availability, X is preferably one of Li, Na, K, Cu, Ag and Fe, and y is in a range of 0.26 to 0.41. When y is excessively small, the structure of the crystal becomes fragile, which results in a decrease in cycle retention rate. When y is excessively large, there is no space for the Li ions to enter, which results in a decrease in battery capacity.

The crystals containing iron, manganese, nickel and cobalt are desirably $LiFePO_4$, $LiMnPO_4$, $LiMn_2O_4$, $LiCoPO_4$, $LiNiPO_4$, $LiCoO_2$, $LiNiO_2$, $LiCoVO_4$, $LiNiVO_4$, $LiMnO_2$, $Li_2FeSiO_4$, $Li_2MnSiO_4$, $Li_2CoSiO_4$, $Li_2NiSiO_4$ or the like.

Any one of the above crystals is the crystal with the structure that can intercalate Li ions thereinto, and which has the improved battery characteristics.

The average crystallite size of the above crystal is desirably equal to or less than 300 nm. The excessive large size of the crystallite leads to a large migration distance of the Li ion, which decreases charging and discharging rates. The average crystallite size is desirably 5 nm or more, and more desirably 10 nm or more.

(Formation of Crystallite and Amorphous Phase)

The positive electrode active material can be obtained by applying heat treatment to an oxide glass containing one or more kinds of metals selected from the group consisting of vanadium, iron, manganese, nickel and cobalt.

The amorphous phase containing phosphorus can be formed by mixing phosphorus powder with one or more kinds of metals selected from the group consisting of vanadium, iron, manganese, nickel and cobalt, and processing the mixture by melt extraction to thereby form the oxide glass. Among these metals, the one or more kinds of metals selected from the group consisting of vanadium, iron and manganese may be preferable because such metals can form the stable amorphous phase in charging and discharging. The amorphous phase containing silicon can also be manufactured by mixing silicon oxide powder with one or more kinds of metals selected from the group consisting of iron, manganese, nickel and cobalt in the same way.

Further, a monovalent cation element can be added to the oxide glass. The monovalent cation is a component for forming the crystallite by the heat treatment.

The crystallite can be formed in the oxide glass by applying the heat treatment to the oxide glass at a crystallization start temperature or more. The crystallite is generated through two stages, involving formation of a crystal nucleus, and growth of the crystal. The state of the crystal generated differs depending on the heat treatment conditions.

In order to form the crystallite having a small diameter (crystallite diameter), the crystal nucleus is precipitated enough at a crystal-nucleus formation temperature kept for a long time, thereafter the crystal is grown.

In order to form the crystallite having a large diameter, the crystal is grown at the crystal-nucleus formation temperature for a short time, and quickly kept at a higher temperature while the number of crystal nuclei is small, which is a general method.

The amorphous phase can remain in the structure of the oxide glass even after the heat treatment by controlling the precipitation and growth of the crystallite. The composition of the amorphous phase differs from the oxide glass before the heat treatment because of a small ratio of the component precipitated as the crystallite.

Hereinafter, the present invention will be described in detail below using Examples. It is noted that the present invention is not limited to the description of Examples mentioned above, and that some of Examples may be combined together.

EXAMPLES (Manufacturing of Oxide Glass)

Table 1 indicates glass compositions manufactured and studied.

Any component is represented % by mass (percentage by mass) in terms of oxide. Raw materials for the respective components are vanadium pentoxide, phosphorus pentoxide, ferric oxide, manganese dioxide, silver oxide, silver suboxide, cobalt oxide, nickel oxide, tungstic oxide, molybdenum oxide, boron oxide and silicon oxide. As to lithium, sodium and potassium, lithium carbonate, sodium carbonate and potassium carbonate were used.

The oxide glass was manufactured in the following way.

First, raw material compounds were arranged and mixed together to have the composition shown in Table 1, and 300 g of the mixed powder was put into a platinum crucible. Then, the mixture was heated up to a heating temperature described in Table 1 at a temperature increasing rate of 5 to 10° C./min (° C./minute) using an electric furnace, and then kept at the constant heating temperature for two hours. Under the constant heating temperature, the mixture was stirred so as to obtain a uniform glass. Thereafter, the platinum crucible was taken out of the electric furnace, and then the mixture was flown over a stainless plate pre-heated at a temperature in a range of 200 to 300° C. to thereby provide an oxide glass.

(Precipitation of Crystallite)

Each oxide glass shown in Table 1 was processed into a specimen of 10×10×4 mm size. The specimen was mounted on an aluminum substrate. The oxide glass described in each of No. 1-4, No. 1-18 and No. 1-23 was heated at 250° C. for 50 hours by the electric furnace. The oxide glass except for No. 1-4, No. 1-18 and No. 1-23 were heated at 420° C. for 50 hours to precipitate crystallites in the oxide glass.

(Observation of Amorphous Phase)

Then, the crystallite and the amorphous phase were observed and the compositions of them were analyzed using an SEM-EDX. The SEM means an abbreviation of a scanning electron microscope, and the EDX means an abbreviation of an energy dispersive X-ray spectrometer.

Figure 2A:
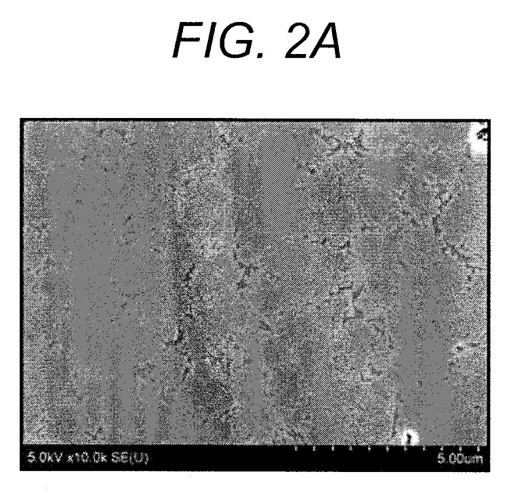
FIG. 2A is an SEM image of a positive electrode active material of Example No. 1-3.
Figure 2B:
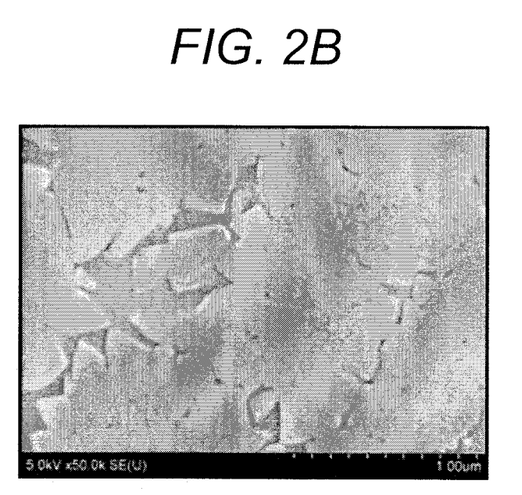
FIG. 2B is an enlarged SEM image of the positive electrode active material shown in FIG. 2A.
Figure 2C:
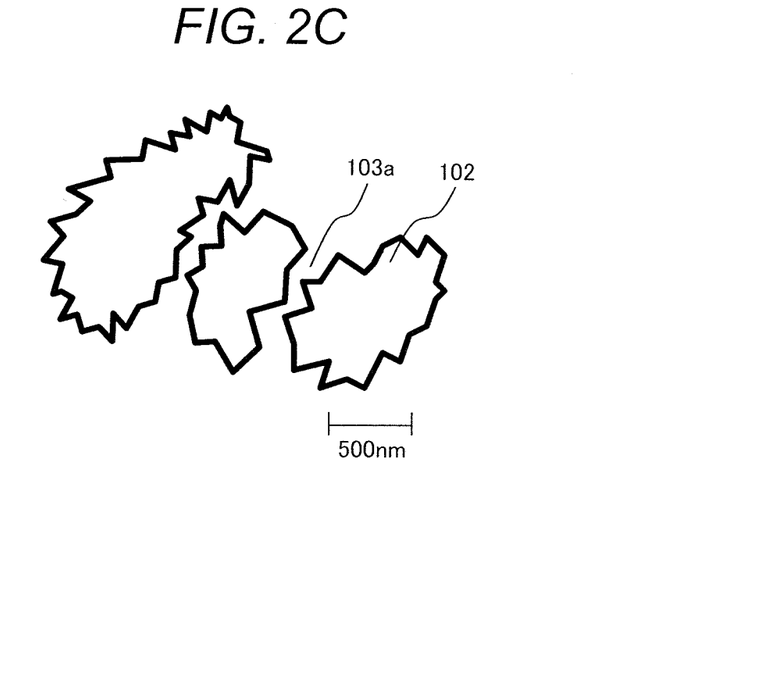
FIG. 2C is an exemplary diagram of the SEM image shown in FIG. 2A.
Figure 2D:
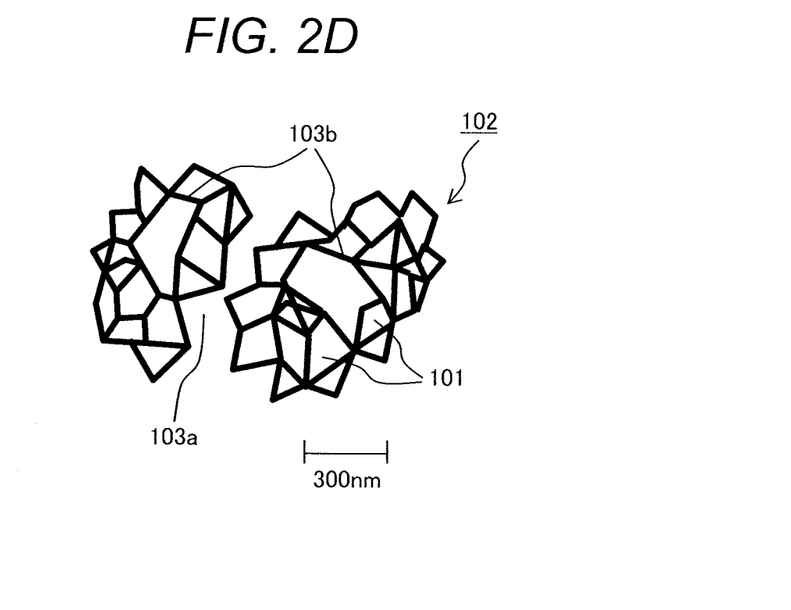
FIG. 2D is an exemplary diagram of the enlarged SEM image shown in FIG. 2B.

FIG. 2A is an SEM image of the specimen No. 1-3 with the crystallite precipitated. FIG. 2B is a further enlarged image of FIG. 2A. FIG. 2C shows an exemplary diagram of the SEM image shown in FIG. 2A. FIG. 2D shows an exemplary diagram of the SEM image shown in FIG. 2B.

As can be seen from FIGS. 2A and 2C, the primary crystal particles 101 are agglutinated to form the secondary particle 102 having a shape like a bunch of grapes. The amorphous phase 103 is formed around the grain boundary region of the secondary particle 102. As can be seen from FIGS. 2B and 2D, the fine amorphous phases 103 are formed in the grain boundary region of the primary crystal particles 101.

Figure 3:
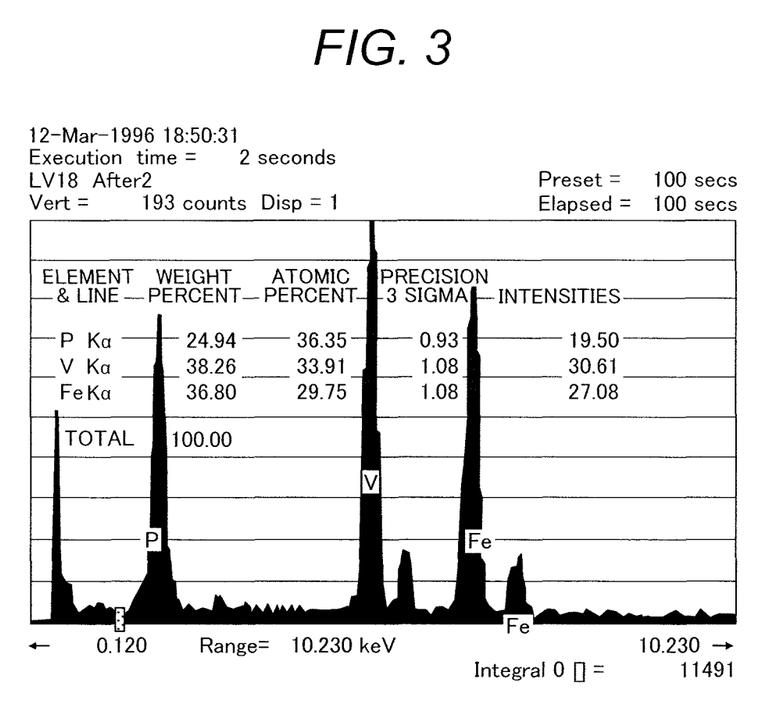
FIG. 3 shows EDX analysis results of an amorphous phase of Example No. 1-3.

FIG. 3 shows the result of composition analysis obtained by the SEM-EDX analysis of a part of the amorphous phase represented by the SEM image shown in FIG. 2B.

FIG. 3 shows that the transition metals contained in the amorphous phase No. 1-3 with the crystallite precipitated therein was vanadium and iron. The ratio of vanadium and iron to phosphorus contained in the amorphous part, that is, based on the number of atoms (atomic ratio) can be determined by the following calculation formula.

TABLE 1

| No. | $V_2O_5$ | $Li_2O$ | $Na_2O$ | $K_2O$ | $Ag_2O$ | $Cu_2O$ | $P_2O_5$ | $Fe_2O_3$ | $MnO_2$ | CoO | NiO | $WO_3$ | $MoO_3$ | $B_2O_3$ | $SiO_2$ | Heating temperature | |
|---|---|---|---|---|---|---|---|---|---|---|---|---|---|---|---|---|---|
| 1-1 | 78 | 3 | | | | | 9 | 10 | | | | | | | | 1000 | Comparative example |
| 1-2 | 77 | 4 | | | | | 8 | 11 | | | | | | | | 1000 | Comparative example |
| 1-3 | 80 | 2 | | | | | 8 | 10 | | | | | | | | 1000 | Example |
| 1-4 | 81 | 2 | | | | | 8 | 9 | | | | | | | | 1000 | Example |
| 1-5 | 79 | 2 | | | | | 9 | 10 | | | | | | | | 1000 | Example |
| 1-6 | 83 | 2 | | | | | 9 | | 6 | | | | | | | 1000 | Example |
| 1-7 | 80 | 2 | | | | | 8 | | 10 | | | | | | | 1000 | Example |
| 1-8 | 72 | 1 | | | | | 13 | 10 | 4 | | | | | | | 1000 | Example |
| 1-9 | 77 | 3 | | | | | 12 | 8 | | | | | | | | 1000 | Example |
| 1-10 | 68 | 2 | | | | | 14 | 16 | | | | | | | | 1000 | Example |
| 1-11 | 76 | | 2 | | | | 10 | 10 | 2 | | | | | | | 1000 | Example |
| 1-12 | 66 | | | 11 | | | 12 | 8 | 3 | | | | | | | 1000 | Example |
| 1-13 | 72 | | | 9 | | | 7 | 10 | | | | | | | | 1000 | Example |
| 1-14 | 74 | | | | 9 | | 8 | 9 | | | | | | | | 1000 | Example |
| 1-15 | 59 | | | | | 15 | 12 | 14 | | | | | | | | 1000 | Example |
| 1-16 | 72 | | | | | | 10 | 14 | 4 | | | | | | | 1000 | Example |
| 1-17 | 78.6 | 2.3 | | | | | 9 | 10.1 | | | | | | | | 1000 | Example |
| 1-18 | | 5 | | | | | 25 | | | | | 70 | | | | 1350 | Comparative example |
| 1-19 | 83.8 | 2.2 | | | | | 8 | 4 | | 2 | | | | | | 1050 | Example |
| 1-20 | 83.8 | 2.2 | | | | | 8 | 4 | | | 2 | | | | | 1050 | Example |
| 1-21 | 78 | 2 | | | | | 10 | | | | | 10 | | | | 1100 | Example |
| 1-22 | 78 | 2 | | | | | 12 | | | | | | 8 | | | 1100 | Example |
| 1-23 | | 5 | | | | | 20 | | | | | | 75 | | | 1150 | Comparative example |
| 1-24 | | 8 | | | | | 30 | 62 | | | | | | | | 1200 | Example |
| 1-25 | | 15 | | | | | 15 | | | | | | | 10 | 60 | 1600 | Example |

[Formula 1]

(Number of Atoms of Transition Metal)/(Number of Atoms of Phosphorus)={(Number of Atoms of V)+(Number of Atoms of Fe)}/(Number of Atoms of Phosphorus)=(33.91+29.75)/36.35=1.75≈1.8     Formula (1)

In the above formula, the ratio of vanadium and iron contained in the amorphous phase No. 1-3 with the crystallite precipitated therein to phosphorus (atomic ratio) is found to be 1.8.

Other specimens shown in Table 1 were also analyzed by the SEM-EDX analysis in the same way, so that the transition metal contained in the amorphous phase was identified. In the specimens whose amorphous phase was detected to include phosphorus, the ratio of vanadium, iron, manganese, nickel and cobalt to phosphorus contained in the amorphous phase (atomic ratio) was measured.

(Evaluation of Crystallite)

Then, each specimen shown in Table 1 was grounded into powder having an average grain size of 5 μm. The crystal state of the thus-obtained powder was evaluated. The ratio of amorphous phase to the powder was measured using a wide-angle X-ray diffraction device (manufactured by Rigaku Corporation, RINT2500HL). The crystal was identified, and a diameter of the crystallite was measured. The conditions for identification of the crystal and measurement of the amorphous ratio were as follows.

An X-ray source was Cu, and had its output of 50 kV and 250 mA. A concentration optical system with a monochrometer attached was used. A divergence slit was selected to be 0.5 deg, a receiving slit was selected to be 0.15 mm, and a scattering slit was selected to be 0.5 deg. The measurement was performed on the following conditions: X-ray diffusion scanning axis 2θ/θ interlocking, continuous scanning range 5≤2θ≤100 deg, scanning rate of 1.0 deg/min, and sampling for each 0.01 deg.

The amorphous ratio was calculated from the ratio of a halo of a diffusion pattern obtained due to the amorphous phase respective to a diffusion peak due to the crystal. The ratio also indicates the ratio of the volume of the amorphous phase to that of the crystallite.

The diffusion peak due to the crystal cannot be detected when the crystallite contained in the specimens for the measurement is too small in principle for the measurement. The wide-angle X-ray diffraction device used for the analysis of Examples cannot detect a diffusion peak due to the crystal when the size of the crystallite (crystallite diameter) contained in the specimens for measurement is equal to or less than 5 nm. Thus, even when the amorphous ratio of the specimen for the measurement is 100%, the result does not necessarily mean that the specimen for the measurement does not contain crystallite.

The identification of the crystal was performed by identifying crystals precipitated in the material using ICDD data which is X-ray diffusion standard data. The identified main crystals included $V_2O_5$ crystal, $Li_{0.3}V_2O_5$ crystal, $Na_{0.287}V_2O_5$ crystal, $Ag_{0.33}V_2O_5$ crystal, $K_{0.33}V_2O_5$ crystal, $Cu_{0.261}V_2O_5$ crystal, $Cu_{0.41}V_2O_5$ crystal, $Fe_{0.33}V_2O_5$ crystal, $LiMnO_2$ crystal and $Li_2FeSiO_4$ crystal.

The crystallite diameter was determined using a diffusion peak with the highest peak intensity among the diffusion peaks due to the crystals identified as a detection main peak. As to the $V_2O_5$ crystal, the (001) surface was used. As to the $Li_{0.3}V_2O_5$ crystal, $Na_{0.287}V_2O_5$ crystal, $Ag_{0.33}V_2O_5$ crystal, $K_{0.33}V_2O_5$ crystal, $Cu_{0.261}V_2O_5$ crystal, $Cu_{0.41}V_2O_5$ crystal, and $Fe_{0.33}V_2O_5$ crystal, the (111) surface was used. As to the $LiMnO_2$ crystal, the (101) surface was used. As to the $Li_2FePO_4$ crystal, the (011) surface was used. From them, the crystallite diameter was calculated.

Now, the measurement method of the crystallite diameter will be given below.

The detailed measurement was performed near an angle giving a detection main peak by narrow scanning. The narrow scanning measurement used the integration scanning as a scanning method. The measurement was performed by limiting the scanning range for the measurement to about the detection main peak. Thus, the crystallite diameter was calculated by the Scherrer formula from a half width of the detection main peak obtained by the narrow scanning.

The result of measurement is shown in Table 2.

The specimens with the same last digit of specimen numbers shown in Tables 1 and 2 correspond to a glass composition of the raw material, and a positive electrode active material manufactured using the raw material, respectively. That is, for example, the specimen No. 1-1 shown in Table 1 corresponds to the specimen No. 2-1 shown in Table 2.

TABLE 2

| No. | Amorphous oxide phase | | | Crystallite | | |
|---|---|---|---|---|---|---|
| | Amorphous ratio | Contained transition metal | (V + Fe + Mn + Ni + Co)/P (Atomic ratio) | main precipitated crystal | Crystallite diameter(nm) | |
| 2-1 | 0% | — | — | $Li_{0.3}V_2O_5$ | 61 | Comparative example |
| 2-2 | 1% | V, Fe | 1.3 | $Li_{0.3}V_2O_5$ | 29 | Comparative example |
| 2-3 | 10% | V, Fe | 1.8 | $Li_{0.3}V_2O_5$ | 69 | Example |
| 2-4 | 100% | V, Fe | 9.0 | — | 3 | Example |
| 2-5 | 10% | V, Fe | 1.4 | $Li_{0.3}V_2O_5$ | 31 | Example |
| 2-6 | 12% | V, Mn | 1.7 | $Li_{0.3}V_2O_5$ | 260 | Example |
| 2-7 | 8% | V, Mn | 2.3 | $Li_{0.3}V_2O_5$ | 78 | Example |
| 2-8 | 15% | V, Fe, Mn | 1.2 | $Li_{0.3}V_2O_5$ | 300 | Example |
| 2-9 | 6% | V, Fe | 0.5 | $Li_{0.3}V_2O_5$ | 245 | Example |
| 2-10 | 32% | V, Fe | 2.8 | $Li_{0.3}V_2O_5$ | 33 | Example |
| 2-11 | 17% | V, Fe, Mn | 1.9 | $Na_{0.287}V_2O_5$ | 43 | Example |
| 2-12 | 11% | V, Fe, Mn | 1.3 | $Ag_{0.33}V_2O_5$ | 21 | Example |
| 2-13 | 19% | V, Fe | 1.6 | $K_{0.33}V_2O_5$ | 51 | Example |
| 2-14 | 15% | V, Fe | 1.7 | $Cu_{0.261}V_2O_5$ | 70 | Example |
| 2-15 | 18% | V, Fe | 1.6 | $Cu_{0.41}V_2O_5$ | 146 | Example |

TABLE 2-continued

| | Amorphous oxide phase | | | Crystallite | | |
|---|---|---|---|---|---|---|
| No. | Amorphous ratio | Contained transition metal | (V + Fe + Mn + Ni + Co)/P (Atomic ratio) | main precipitated crystal | Crystallite diameter(nm) | |
| 2-16 | 18% | V, Fe, Mn | 1.6 | $Fe_{0.33}V_2O_5$ | 39 | Example |
| 2-17 | 9% | Fe | 1.0 | $Li_{0.3}V_2O_5$ | 55 | Example |
| 2-18 | 100% | W | 0.0 | — | 3 | Comparative example |
| 2-19 | 10% | V, Fe, Co | 1.6 | $Li_{0.3}V_2O_5$ | 60 | Example |
| 2-20 | 10% | V, Fe, Ni | 1.6 | $Li_{0.3}V_2O_5$ | 60 | Example |
| 2-21 | 11% | V, Co | 2.0 | $Li_{0.3}V_2O_5$ | 37 | Example |
| 2-22 | 11% | V, Ni | 1.4 | $Li_{0.3}V_2O_5$ | 35 | Example |
| 2-23 | 100% | Mo | 0.0 | — | 3 | Comparative example |
| 2-24 | 10% | Mn | 0.9 | $LiMnO_2$ | 10 | Example |
| 2-25 | 75% | Fe | — | $Li_2FeSiO_4$ | 12 | Example |

In Tables 1 and 2, the specimens described as "Examples" are preferred specific examples of the present invention in the present application, and contain any one or more kinds of metals consisting of vanadium, iron, manganese, nickel and cobalt in the amorphous phase with an amorphous ratio being 6% by volume or more. Further, in Examples No. 2-3 to No. 2-17, No. 2-19 to No. 2-22 and No. 2-24 containing phosphorus, anatomic ratio of vanadium, iron, manganese, nickel and cobalt to phosphorus contained in the amorphous phase is in a range of 0.5 to 9.0.

Each of the specimens No. 2-4, No. 2-18 and No. 2-23 was confirmed that the amorphous ratio calculated by X-ray diffraction was 100%, but the crystallite having an average crystallite diameter of 3 nm was precipitated by the TEM observation. However, the precipitated crystals were not identified.

The main crystals (main precipitated crystals) contained in the specimens described in Examples are $V_2O_5$ crystal, $Li_{0.3}V_2O_5$ crystal, $Na_{0.287}V_2O_5$ crystal, $Ag_{0.33}V_2O_5$ crystal, $K_{0.33}V_2O_5$ crystal, $Cu_{0.261}V_2O_5$ crystal, $Cu_{0.41}V_2O_5$ crystal, $Fe_{0.33}V_2O_5$ crystal, $LiMnO_2$ crystal and $Li_2FeSiO_4$ crystal. The crystallite diameter is 300 nm or less.

In contrast, the specimens that do not satisfy the compositions of the above examples are indicated by "Comparative Example" as a specific example departing from the present invention of the present application or which is not a preferable one with respect to the present invention of the present application.

(Evaluation of Batteries)

Now, the evaluation of the Li ion secondary batteries will be described below.

Figure 4:
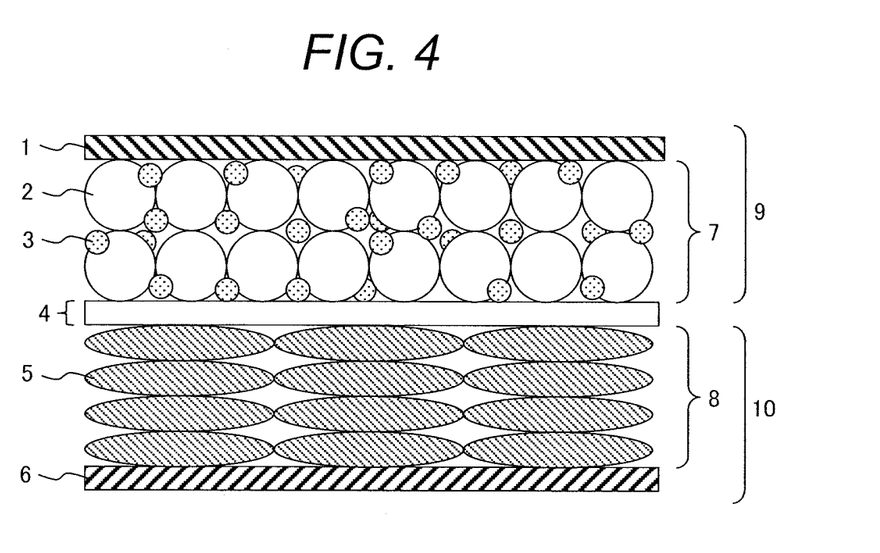
FIG. 4 is a cross-sectional view showing the structure of a lithium ion secondary battery of Examples.

FIG. 4 is a schematic diagram showing one example of the lithium ion battery. The evaluation will be given below with reference to the accompanying drawings.

In the figure, a positive electrode collector 1 has on its surface, a positive electrode layer 7 containing a positive electrode active material 2 and an auxiliary conducting agent 3, which form a positive electrode 9. A negative electrode collector 6 has on its surface, a negative electrode layer 8 containing a negative electrode active material 5, which form a negative electrode 10.

Specifically, 90% by mass of powder (positive electrode active material 2) ground and adjusted to have an average grain diameter of 5 μm, 10% by mass of carbon black (auxiliary conducting agent 3), and 5% by mass of binder were mixed, to which normal methyl pyrrolidone was added to thereby produce a paste having a viscosity of 15 Pa·S. The produced paste was applied and dried to an aluminum foil of the positive electrode collector 1 using a doctor blade, whereby the positive electrode layer 7 was produced. Then, the positive electrode layer 7 and the positive electrode collector 1 were punched to thereby manufacture a positive electrode 9.

The negative electrode layer 8 was formed over a copper foil of the negative electrode collector 6 using the negative electrode active material 5, subjected to roll pressing, and then punched in the same way as the positive electrode 9 to thereby manufacture the negative electrode 10.

The separator 4 was sandwiched between the positive electrode 9 and the negative electrode 10, which manufactured three coin cells.

At this time, an electrolyte used was a mixed solvent (EC: DEC=1:3) of ethylene carbonate (EC) and diethylene carbonate (DEC) which contained 1 mole of lithium borofluoride ($LiBF_4$), and a lithium foil was used as a supply source of the lithium ions.

In the specimens No. 2-1 to 2-23, and No. 2-25, the charging and discharging of the coil cell was performed at a current density of 0.2 mA/cm$^2$ in a range of 4.2 to 1.5 V (vs. Li/Li$^+$). Then, an initial capacity, a discharging average voltage, an energy density, and a capacity retention rate after 100 cycles were measured.

In the specimen No. 2-24, the charging and discharging of the coin cell was performed at a current density of 0.2 mA/cm$^2$ in a range of 4.5 to 2 V (vs. Li/Li$^+$). Then, an initial capacity, a discharging average voltage, an energy density, and a capacity retention rate after 50 cycles were measured.

The result of evaluation of the batteries is shown in Table 3.

In the present Table, the energy density of less than 700 mAh/g was indicated by "X", and the energy density of 700 mAh/g or more was indicated by "◯", while the cycle retention rate of less than 70% was indicated by "X", the cycle retention rate of not less than 70% and less than 80% was indicated by "Δ", and the cycle retention rate of 80% or more was indicated by "◯". The worse one of both results of these items was defined as "judgment result of battery characteristics", which was the total judgment.

TABLE 3

| | Amorphous phase | | | Crystallite | | Battery characteristics | | | | | |
|---|---|---|---|---|---|---|---|---|---|---|---|
| | Amorphous ratio | Contained transition metal | (V + Fe + Mn + Ni + Co)/P (Atomic ratio) | Main precipitated crystal | Crystallite diameter (nm) | Initial capacity (mAh/g) | Discharge average voltage | Energy density (mWh/g) | Cycle retention rate | Judgment | |
| 2-1 | 0% | — | — | $Li_{0.3}V_2O_5$ | 61 | 339 | 2.5 V | 848 | 48% | x | Comparative example |
| 2-2 | 1% | V, Fe | 1.3 | $Li_{0.3}V_2O_5$ | 29 | 376 | 2.5 V | 940 | 76% | Δ | Comparative example |
| 2-3 | 10% | V, Fe | 1.8 | $Li_{0.3}V_2O_5$ | 69 | 377 | 2.5 V | 943 | 91% | ○ | Example |
| 2-4 | 100% | V, Fe | 9.0 | — | 3 | 326 | 2.5 V | 815 | 100% | ○ | Example |
| 2-5 | 10% | V, Fe | 1.4 | $Li_{0.3}V_2O_5$ | 31 | 342 | 2.5 V | 855 | 95% | ○ | Example |
| 2-6 | 12% | V, Mn | 1.7 | $Li_{0.3}V_2O_5$ | 260 | 368 | 2.5 V | 920 | 94% | ○ | Example |
| 2-7 | 8% | V, Mn | 2.3 | $Li_{0.3}V_2O_5$ | 78 | 378 | 2.5 V | 945 | 92% | ○ | Example |
| 2-8 | 15% | V, Fe, Mn | 1.2 | $Li_{0.3}V_2O_5$ | 300 | 362 | 2.5 V | 905 | 97% | ○ | Example |
| 2-9 | 6% | V, Fe | 0.5 | $Li_{0.3}V_2O_5$ | 245 | 386 | 2.5 V | 965 | 92% | ○ | Example |
| 2-10 | 32% | V, Fe | 2.8 | $Li_{0.3}V_2O_5$ | 33 | 350 | 2.5 V | 875 | 93% | ○ | Example |
| 2-11 | 17% | V, Fe, Mn | 1.9 | $Na_{0.287}V_2O_5$ | 43 | 313 | 2.5 V | 808 | 97% | ○ | Example |
| 2-12 | 11% | V, Fe, Mn | 1.3 | $Ag_{0.33}V_2O_5$ | 21 | 309 | 2.5 V | 798 | 98% | ○ | Example |
| 2-13 | 19% | V, Fe | 1.6 | $K_{0.33}V_2O_5$ | 51 | 306 | 2.5 V | 790 | 92% | ○ | Example |
| 2-14 | 15% | V, Fe | 1.7 | $Cu_{0.281}V_2O_5$ | 70 | 318 | 2.5 V | 820 | 93% | ○ | Example |
| 2-15 | 18% | V, Fe | 1.6 | $Cu_{0.41}V_2O_5$ | 146 | 308 | 2.5 V | 820 | 90% | ○ | Example |
| 2-16 | 18% | V, Fe, Mn | 1.6 | $Fe_{0.33}V_2O_5$ | 39 | 308 | 2.5 V | 795 | 94% | ○ | Example |
| 2-17 | 9% | Fe | 1.0 | $Li_{0.3}V_2O_5$ | 55 | 300 | 2.5 V | 750 | 90% | ○ | Example |
| 2-18 | 100% | W | 0.0 | — | 3 | 80 | 2.5 V | 200 | 70% | x | Comparative example |
| 2-19 | 10% | V, Fe, Co | 1.6 | $Li_{0.3}V_2O_5$ | 60 | 353 | 2.5 V | 883 | 30% | ○ | Example |
| 2-20 | 10% | V, Fe, Ni | 1.6 | $Li_{0.3}V_2O_5$ | 60 | 361 | 2.5 V | 903 | 91% | ○ | Example |
| 2-21 | 11% | V, Co | 2.0 | $Li_{0.3}V_2O_5$ | 37 | 349 | 2.5 V | 873 | 90% | ○ | Example |
| 2-22 | 11% | V, Ni | 1.4 | $Li_{0.3}V_2O_5$ | 35 | 351 | 2.5 V | 878 | 91% | ○ | Example |
| 2-23 | 100% | Mo | 0.0 | — | 3 | 60 | 2.5 V | 150 | 72% | x | Comparative example |
| 2-24 | 10% | Mn | 0.9 | $LiMnO_2$ | 10 | 260 | 3.5 V | 910 | 80% | ○ | Example |
| 2-25 | 75% | Fe | — | $Li_2FeSiO_4$ | 12 | 271 | 2.7 V | 732 | 85% | ○ | Example |

As shown in Table 3, the specimens No. 2-18 and No. 2-23 not containing vanadium, iron, manganese, nickel and cobalt in the amorphous phase had the low energy density and cycle retention rate. The specimen No. 2-1 with the amorphous ratio of 0%, and the specimen No. 2-2 with the amorphous ratio of 1% had the large energy density and the low cycle retention rate. In contrast, any one of Examples (No. 2-3 to 2-17, No. 2-19 to 2-22, and No. 2-24 to 2-25) described in Table 3 had an energy density of 700 mWh/g or more, and a cycle retention rate of 80% or more. In particular, the specimen No 2-24 had a high average discharging voltage.

Generally, the crystal phase has the large charging and discharging capacity (initial capacity), but tends to be changed into the amorphous phase, which results in low charging and discharging cycle retention rate. Thus, the charging and discharging cycle retention rate of the crystal phase has been required to be improved.

In contrast, the amorphous phase has been hitherto supposed to have a low charging and discharging capacity. As can be seen from Table 3, such a specimen as that of No. 2-4 had the large initial capacity and energy density. That is, the amorphous phase having such a specific structure as shown in Examples had the large initial capacity and energy density.

This is a new finding that was revealed by studies of the present invention.

As mentioned above, Examples are characterized in amorphous phase in the grain boundary region of the crystallite, and do not depend on the types of crystals. It is apparent that crystals that can be formed of amorphous phase, such as $LiFePO_4$, $LiMnPO_4$, $LiMn_2O_4$, $LiCoPO_4$, $LiNiPO_4$, $LiCoO_2$, $LiNiO_2$, $LiCoVO_4$, $LiNiVO_4$, $Li_2FeSiO_4$, $Li_2MnSiO_4$, $Li_2CoSiO_4$, $Li_2NiSiO_4$ can also have the same effects.

(Li Ion Dope)

Figure 5:
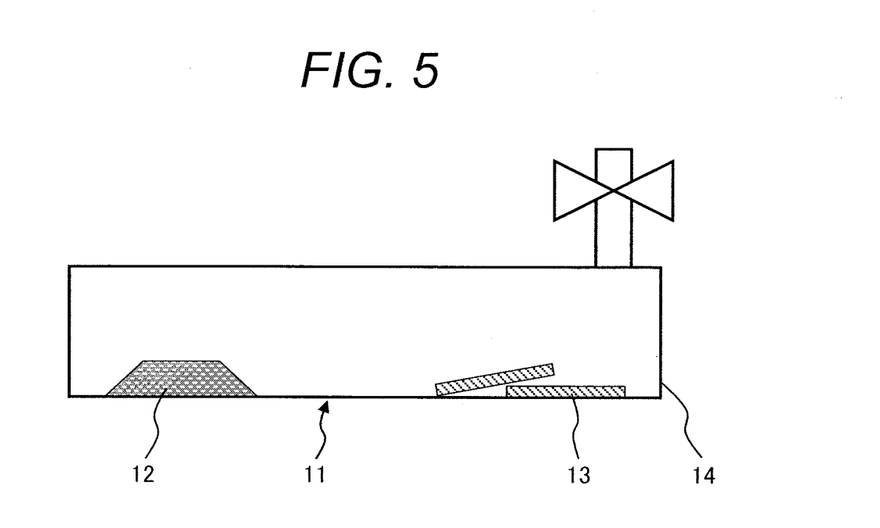
FIG. 5 is a cross-sectional view exemplarily showing a lithium ion doping device.

FIG. 5 shows a lithium ion doping device.

In the figure, a lithium ion doping device 11 is formed of SUS, and is designed to be capable of independently heating left and right parts of a reaction casing 14, while creating a vacuum in the inside of the casing.

The operation procedure of the device will be performed as follows.

The lithium ion doping device 11 was set inside a glove box purged with nitrogen gas. Then, 10 g of the positive electrode active material No. 2-3 (indicated by reference numeral 12), and 5 g of the metal lithium (indicated by reference numeral 13) were charged into the reaction casing 14 so as not to be contact with each other. The left part of the reaction casing 14 into which the positive electrode active material 12 was charged was heated with a ribbon heater by being evacuating for three hours. Then, a valve of the reaction casing 14 was closed, and removed from a vacuum line. Thereafter, the specimen was heated with a mantle heater at 350° C., and reacted for two weeks.

Then, the specimen was taken from the reaction casing 14 within the glove box at dew point of −90° C. The initial capacity and high-speed charging and discharging of the specimen were evaluated without using a lithium foil as a supply source of lithium ions, in the same way as Example No. 2-3 shown in Table 3.

As a result, the initial capacity was 353 mAh/g, the average operation voltage was 2.5 V, the energy density was 883 mWh/g, and the cycle retention rate was 91%. Such high characteristics were confirmed.

Description of Reference Numerals

1: positive electrode collector, 2: positive electrode active material, 3: auxiliary conducting agent, 4: separator, 5: negative electrode active material, 6: negative electrode collector, 7: positive electrode layer, 8: negative electrode layer, 9: positive electrode, 10: negative electrode, 11: lithium doping device, 12: positive electrode active material, 13: metal lithium, 14: reaction casing, 101: primary particle, 102: secondary particle, 103: amorphous phase

The invention claimed is:

1. A positive electrode active material comprising:
a crystal phase formed of a plurality of crystallites; and
an amorphous phase formed between the crystallites,
wherein the amorphous phase contains one or more kinds of metal oxides selected from the group consisting of vanadium oxide, iron oxide, manganese oxide, nickel oxide and cobalt oxide,
wherein the crystal phase and the amorphous phase are capable of intercalation and deintercalation of a lithium ion, and
wherein the crystallites are selected from the group consisting of $Fe_yV_2O_5$ (y is a range of 0.26 to 0.41), $LiADO_4$ (A is one kind of metal selected from Fe, Mn, Ni, and Co, and D is one kind of element selected from P or V), and $Li_2ASiO_4$ (A is one kind of metal selected from Fe, Mn, Ni, and Co).

2. The positive electrode active material according to claim 1,
wherein the crystal phase and the amorphous phase form powder particles.

3. The positive electrode active material according to claim 1,
wherein the amorphous phase contains a phosphorus oxide.

4. The positive electrode active material according to claim 2,
wherein a content of the amorphous phase in the powder particles is 6% by volume or more.

5. The positive electrode active material according to claim 3,
wherein an atomic ratio of a content of vanadium, iron, manganese, nickel and cobalt in the amorphous phase to a content of phosphorus in the amorphous phase is in a range of 0.5 to 9.0.

6. The positive electrode active material according to claim 1,
wherein an average crystallite size of the crystallites is 300 nm or less.

7. The positive electrode active material according to claim 1,
further containing carbon.

8. A positive electrode active material comprising:
a crystal phase comprising a plurality of crystallites, wherein the crystallites comprise at least one selected from the group consisting of $Fe_yV_2O_5$ (y is a range of 0.26 to 0.41), $LiFePO_4$, $LiMnPO_4$, $LiMn_2O_4$, $LiCoPO_4$, $LiNiPO_4$, $LiCoO_2$, $LiNiO_2$, $LiCoVO_4$, $LiNiVO_4$, $LiMnO_2$, $Li_2FeSiO_4$, $Li_2MnSiO_4$, $Li_2CoSiO_4$, $Li_2NiSiO_4$; and
an amorphous phase between the crystallites, wherein the amorphous phase comprises one or more metal oxides selected from the group consisting of vanadium oxide, iron oxide, manganese oxide, nickel oxide and cobalt oxide,
wherein the crystal phase and the amorphous phase are capable of intercalation and deintercalation of a lithium ion.

9. The positive electrode active material according to claim 8,
wherein the crystal phase and the amorphous phase form powder particles.

10. The positive electrode active material according to claim 8,
wherein the amorphous phase further comprises a phosphorus oxide.

11. The positive electrode active material according to claim 9,
wherein a content of the amorphous phase in the powder particles is 6% by volume or more.

12. The positive electrode active material according to claim 10,
wherein an atomic ratio of a content of vanadium, iron, manganese, nickel and cobalt in the amorphous phase to a content of phosphorus in the amorphous phase is in a range of 0.5 to 9.0.

13. The positive electrode active material according to claim 8,
wherein an average crystallite size of the crystallites is 300 nm or less.

14. The positive electrode active material according to claim 8,
further comprising carbon.

* * * * *